United States Patent
Krishnamurthy et al.

(10) Patent No.: US 11,042,170 B2
(45) Date of Patent: *Jun. 22, 2021

(54) PROCESS AND APPARATUS FOR REDUCING PRESSURE IN A FLUE GAS STREAM

(71) Applicant: UOP LLC, Des Plaines, IL (US)

(72) Inventors: Sujay R. Krishnamurthy, Hoffman Estates, IL (US); Paolo Palmas, Des Plaines, IL (US); Thomas W. Lorsbach, Austin, TX (US)

(73) Assignee: UOP LLC, Des Plaines, IL (US)

( * ) Notice: Subject to any disclaimer, the term of this patent is extended or adjusted under 35 U.S.C. 154(b) by 336 days.

This patent is subject to a terminal disclaimer.

(21) Appl. No.: 16/044,293

(22) Filed: Jul. 24, 2018

(65) Prior Publication Data

US 2020/0033893 A1 Jan. 30, 2020

(51) Int. Cl.
*G05D 7/06* (2006.01)
*F23L 13/00* (2006.01)

(52) U.S. Cl.
CPC .............. *G05D 7/0623* (2013.01); *F23L 13/00* (2013.01); *G05D 7/0676* (2013.01)

(58) Field of Classification Search
CPC ..... C10G 11/187; F23L 13/00; G05D 7/0623; G05D 7/0676; B01J 29/90
USPC ....................... 702/47, 50; 208/153; 422/144
See application file for complete search history.

(56) References Cited

U.S. PATENT DOCUMENTS

| | | | |
|---|---|---|---|
| 2,545,682 A | 3/1951 | Bergman | |
| 2,670,278 A | 2/1954 | King | |
| 4,985,136 A * | 1/1991 | Bartholic | B01J 8/085 |
| | | | 208/113 |
| 5,958,222 A | 9/1999 | Radcliffe | |
| 10,413,891 B1 * | 9/2019 | Krishnamurthy | B01J 38/30 |
| 2006/0266048 A1 | 11/2006 | Bell | |

* cited by examiner

*Primary Examiner* — John H Le
(74) *Attorney, Agent, or Firm* — Paschall & Associates, LLC; James C. Paschall

(57) ABSTRACT

A process and apparatus for reducing pressure of a flue gas stream including passing a pressurized flue gas stream to a vessel and through a bed of particulates in the vessel to reduce the pressure of the flue gas stream. The flue gas passes from the vessel at a lower pressure than at which it entered. The bed of particulates is disposed in the vessel between the outlet end of the inlet conduit and the inlet end of the outlet conduit. If deposits develop in the bed of particulates, the particulates can be replaced with fresh particulates to avoid excessive pressure drop. Data may be received from a stream in fluid communication with the foregoing process and apparatus.

20 Claims, 3 Drawing Sheets

PROCESS AND APPARATUS FOR REDUCING PRESSURE IN A FLUE GAS STREAM

FIELD

The field is management of a flue gas stream from a catalyst regenerator and particularly from a catalytic regenerator such as in a fluid catalytic cracking (FCC) unit or a methanol to olefins (MTO) unit.

BACKGROUND

FCC technology has undergone continuous improvement and remains the predominant source of gasoline production in many refineries. This gasoline, as well as lighter products, is formed as the result of cracking heavier, higher molecular weight, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst. Coke must be burned off of the catalyst in a regenerator.

When a catalyst is exposed to oxygenates, such as methanol, to promote a reaction to olefins in a MTO process, carbonaceous material is generated and deposited on the catalyst. Accumulation of coke deposits interferes with the catalyst's ability to promote the MTO reaction. As the amount of coke deposit increases, the catalyst loses activity and less of the feedstock is converted to the desired olefin product. The step of regeneration removes the coke from the catalyst by combustion with oxygen, restoring the catalytic activity of the catalyst. The regenerated catalyst may then be exposed again to oxygenates to promote the conversion to olefins.

Conventional catalyst regenerators typically include a vessel having a spent catalyst inlet, a regenerated catalyst outlet and a combustion gas distributor for supplying air or other oxygen containing gas to the bed of catalyst that resides in the vessel. Cyclone separators remove catalyst entrained in the flue gas before the flue gas exits the regenerator vessel. Downstream vessels which also may utilize cyclonic separation may also be employed to remove catalyst fines from flue gas streams.

The heat of combustion in the regenerator typically produces flue gas at temperatures of 677° to 788° C. (1250° to 1450° F.) and at a pressure range of 138 to 276 kPa (20 to 40 psig). Although the pressure is relatively low, the extremely high temperature, high volume of flue gas from the regenerator contains sufficient kinetic energy to warrant recovery of energy. Flue gas may be fed to a power recovery unit, which may include an expander turbine. The kinetic energy of the flue gas is transferred through blades of the expander to a rotor coupled either to a main air blower, to produce combustion air for the FCC regenerator, and/or to a generator to produce electrical power. The flue gas may also be run to a steam generator for further energy recovery.

Flue gas streams that may have passed through a third stage separator, a flue gas cooler and/or power recovery equipment must still be reduced in pressure before it is exhausted from a stack. Orifice chambers use grids with holes to impose a pressure drop on the flue gas prior to venting through the stack.

More improved pressure reduction vessels can streamline catalyst regenerator flue gas processing.

SUMMARY

A process and apparatus for reducing pressure of a flue gas stream comprises passing a pressurized flue gas stream from a catalyst regenerator to a pressure reduction vessel and through a bed of particulates in the pressure reduction vessel to reduce the pressure of the flue gas stream. The flue gas passes from the vessel at a lower pressure. The bed of particulates is disposed in the vessel between the outlet end of the inlet conduit and the inlet end of the outlet conduit. If deposits develop in the bed of particulates, the particulates can be replaced with fresh particulates to avoid excessive pressure drop. Moreover, the process and apparatus afford the ability to balance pressure drop between the slide valve and the packed bed vessel by changing the packed vessel inventory as the flue gas rate changes. Data may be received from a stream in fluid communication with the foregoing process and apparatus. The data may be transmitted, analyzed and used as basis for adjusting conditions in the process.

Additional features and advantages of the invention will be apparent from the description of the invention, figures and claims provided herein.

DEFINITIONS

Figure 1:
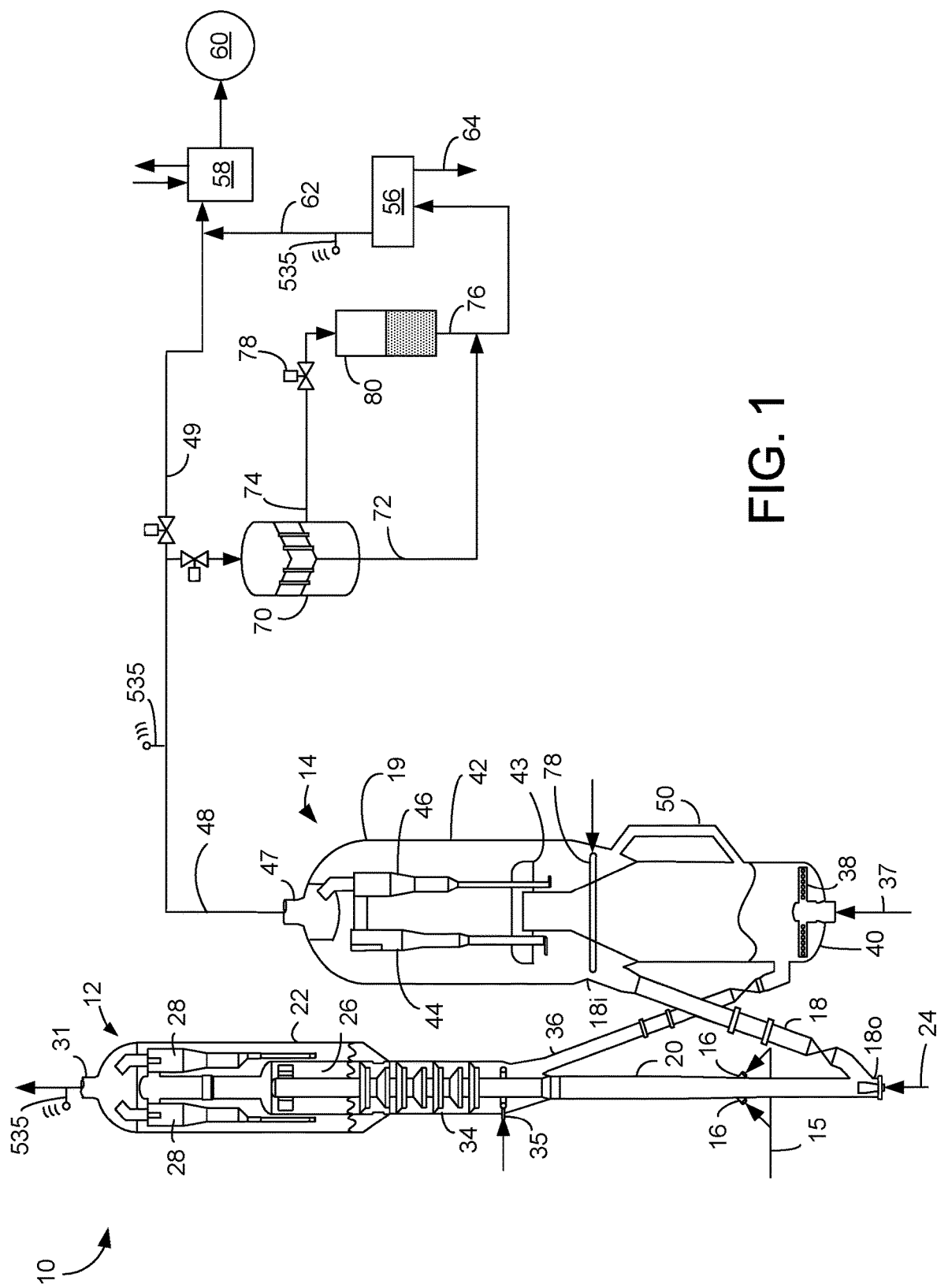
FIG. 1 is a schematic drawing of an FCC unit of the present invention.

The term "communication" means that fluid flow is operatively permitted between enumerated components, which may be characterized as "fluid communication". The term "communication" may also mean that data or signals are transmitted between enumerated components which may be characterized as "informational communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

As used herein, the term "separator" means a vessel which has an inlet and at least two outlets.

As used herein, the term "predominant" or "predominate" means greater than 50 wt %, suitably greater than 75 wt % and preferably greater than 90 wt %.

As used herein, the term "a component-rich stream" means that the rich stream coming out of a vessel has a greater concentration of the component than the feed to the vessel.

DETAILED DESCRIPTION

We have found that grid holes in conventional orifice chambers are prone to erosion due to the particulate content in the flue gas stream eroding the holes and reducing the degree of pressure drop imposed on the flue gas stream over time. This pressure drop degradation forces the operator to move the upstream slide valve to a more closed position to shift the pressure drop to the upstream slide valve, which could potentially expose the flue gas line to high noise and vibration problems. Further, the higher velocity across the slide valve increases erosion in the valve with corresponding reductions in the useful life of the expensive valves. Pressure drop imbalance can also occur as a result of flue gas rate changes. Moreover, the grid spacing requirements result in tall orifice chambers, especially for larger units. Lastly, in resid FCC units, the formation of eutectic deposits on the holes in the grids result in significant plugging of the holes in the orifice chamber. The refiner often resorts taking the orifice chamber off-line and injecting walnut shells into it to unplug the holes.

The embodiments herein are applicable to replacing perforated plates in an orifice chamber with particulate material which can impose a pressure drop on the passing flue gas stream. If deposits on the particulates become excessive, the depositified particulates can be replenished with clean particulates. The particulate material will not be subjected to erosion since they are not rigidly packed together. Moreover, the particulate material may be constructed from erosion resistant ceramic materials such as alumina and/or silica.

Now turning to the FIG. 1, wherein like numerals designate like components, the FIG. 1 illustrates a process and apparatus 1 for fluid catalytic cracking (FCC). An FCC unit 10 includes a reactor 12 and a regenerator 14. Process variables typically include a cracking reaction temperature of 400 to 600° C. and a catalyst regeneration temperature of 500 to 900° C. Both the cracking and regeneration occur at an absolute positive pressure below about 5 atmospheres.

The FIG. 1 shows a typical FCC process unit, in which a heavy hydrocarbon feed or raw oil stream in a line 15 is distributed by distributors 16 into a riser 20 to be contacted with a newly regenerated cracking catalyst entering from a regenerator conduit 18. This contacting may occur in the narrow riser 20, extending upwardly to the bottom of a reactor vessel 22. The contacting of feed and catalyst is fluidized by gas from a fluidizing line 24. Heat from the catalyst vaporizes the hydrocarbon feed, and the hydrocarbon feed is thereafter cracked to lighter molecular weight hydrocarbons in the presence of the catalyst as both are transferred up the riser 20 into the reactor vessel 22. The cracked light hydrocarbon products are thereafter separated from the cracking catalyst using cyclonic separators which may include a rough cut separator 26 and one or two stages of cyclones 28 in the reactor vessel 22. Product gases exit the reactor vessel 22 through a product outlet 31 for transport to a product recovery section which is not shown. Inevitable side reactions occur in the riser 20 leaving coke deposits on the catalyst that lower catalyst activity. The spent catalyst requires regeneration for further use. Coked catalyst, after separation from the gaseous product hydrocarbon, falls into a stripping section 34 where steam is injected through a nozzle 35 to a distributor to purge any residual hydrocarbon vapor. After the stripping operation, the coked catalyst is fed to the catalyst regenerator 14 through a spent catalyst conduit 36.

The FIG. 1 depicts a regenerator 14 comprising a regenerator vessel 19 known as a combustor. However, other types of regenerators are suitable. In the catalyst regenerator 14, a stream of oxygen-containing gas, such as air, is introduced from a line 37 through an air distributor 38 to contact the spent catalyst in a first, lower chamber 40, combust coke deposited thereon, and provide regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 42 through a disengager 43. Finer separation of the regenerated catalyst and flue gas exiting the disengager 43 is achieved using first and second stage separator cyclones 44, 46, respectively within the upper chamber 42 of the catalyst regenerator 14. Catalyst separated from flue gas dispenses through dip legs from the cyclones 44, 46 while flue gas relatively lighter in catalyst sequentially exits cyclones 44, 46 and is discharged from the regenerator vessel 14 through a flue gas outlet 47 in a flue gas line 48.

Regenerated catalyst may be recycled back to the reactor 12 through the regenerator conduit 18. The riser 20 of the reactor 12 may be in downstream communication with the regenerator vessel 19 of the regenerator 14. The regenerator conduit has an inlet end 18$i$ connecting to the regenerator vessel 19, in an aspect the upper chamber 42 of the regenerator vessel 19, for receiving regenerated catalyst therefrom and an outlet end 18$o$ connecting to the riser 20 of the reactor 12 for transporting regenerated catalyst to the riser 20 of the reactor 12. As a result of the coke burning, the flue gas vapors exiting at the top of the catalyst regenerator 14 in the flue gas line 48 contain $SO_x$, $NO_x$, CO, $CO_2$, $N_2$, $O_2$ and $H_2O$, along with smaller amounts of other species. Additionally, some of these species may exit with regenerated catalyst exiting in a regenerator conduit 18 and enter the riser 20 of the reactor 12. In a combustor regenerator shown in the FIG. 1, regenerated catalyst may be transported from the upper chamber 42 into the lower chamber 40 of the regenerator vessel 19 through the catalyst cooler that is not shown and/or through a recycle conduit 50.

Hot flue gas is discharged from the regenerator 14 through the flue gas outlet 47 into a flue gas line 48 in downstream communication with the regenerator 14. A separator may be in downstream communication with the flue gas line 48 for separating regenerated catalyst from the flue gas. Catalyst particles may be separated from discharged flue gas in line 48 by any suitable separator. A suitable separator includes a third stage separator (TSS) 70 which comprises a vessel containing multiple cyclone separators. A TSS 70 may be the separator that is in downstream communication with the regenerator 14. Flue gas discharged in flue gas line 48 may be delivered to the TSS 70 which removes catalyst from flue gas discharged from the regenerator by cyclonic separation. The flue gas line 48 may feed flue gas through an isolation valve to the TSS 70. In the event of upset or other abnormality, flue gas may also bypass the TSS 70 in bypass line 49 through a control valve thereon. The TSS 70 is a vessel that contains a plurality of cyclone separators, which remove a predominance of remaining catalyst particles by centripetal acceleration from the flue gas into an underflow gas line 72. The TSS 70 comprises two tube sheets with a plurality of cyclones extending through the tube sheets. In an aspect, inlets to the cyclones are above both tube sheets, dirty gas outlets of the cyclones are provided between the tube sheets and clean gas outlets are provided below the tube sheets. Clean flue gas exits the TSS 70 in an inlet gas conduit 74. Reference may be had to U.S. Pat. No. 7,316,733 for an example of a TSS vessel. Typically, at least 1 wt % but no more than 10 wt % and preferably no more than 5 wt % of the flue gas that enters the TSS 70 will exit the TSS as dirty gas in the underflow gas line 72 laden with separated regenerated catalyst.

Clean flue gas in the inlet gas conduit 74 exiting the TSS 70 may enter a pressure reduction vessel 80 to reduce its kinetic energy. To control the flow of flue gas between the TSS 70 and the pressure reduction vessel 80, an inlet valve 78 may be provided upstream of the pressure reduction vessel 80 to further control the gas flow entering the pressure reduction vessel 80. The valve 78 may be a control valve and specifically a slide valve that is in communication with the inlet gas conduit 74 for regulating the flow therethrough. The flue gas stream passes through the inlet valve 78 to enter the pressure reduction vessel 80.

The pressure reduction vessel 80 reduces the pressure of the flue gas stream in the inlet gas conduit 74. The clean flue gas stream reduced in pressure in an outlet gas conduit 76 may or may not be joined by underflow gas in underflow gas line 72 through a critical flow nozzle and flow to a steam generator 58 and to an outlet stack 60. The clean flue gas stream reduced in pressure in an outlet gas conduit 76 may also be joined by a bypass flue gas stream in the bypass line 49 before flowing to the steam generator 58 and to the outlet stack 60. Optionally, the combined stream of exhausted clean flue gas and waste gas may be scrubbed in a scrubber and/or have catalyst particulates further removed in an electrostatic precipitator before it is exhausted to the atmosphere in the outlet stack 60. As such, the clean flue gas stream reduced in pressure and perhaps joined by the underflow gas stream in the underflow gas line 72 may be processed in a catalyst fines removal device 56 comprising an electrostatic precipitator or a wet gas scrubber before flowing to the steam generator 58 or the outlet stack 60 in low fines line 62. Fines can be removed from the catalyst fines removal device 56 in fines line 64. The steam generator 58 may also be known as a flue gas cooler which generates steam by cooling the flue gas in line 49 and/or in gas outlet line 76.

The dirty gas stream in underflow line 72 may comprise at least 1 wt % but no more than about 10 wt %, typically no more than about 5 wt %, suitably no more than about 4 wt % of the flue gas fed to the TSS 70 in line 48. The underflow gas in line 72 may have catalyst removed from it in an optional fourth stage separator (not shown) which comprises an additional cyclone separator before combining with the clean flue gas stream reduced in pressure. In an embodiment, a filter (not shown) can be provided as a separator to further remove catalyst that exits the TSS 70 in the dirty gas stream in underflow line 72 by filtration. The underflow gas in line 72 may join the clean flue gas stream in gas outlet line 76 after it is reduced in pressure.

The pressure reduction vessel 80 may be in downstream communication with the inlet gas conduit 74 which is in downstream communication with the catalyst regenerator 14. The pressurized flue gas may be passed from the catalyst regenerator 14 to the pressure reduction vessel 80 via the inlet gas conduit 74.

Figure 2:
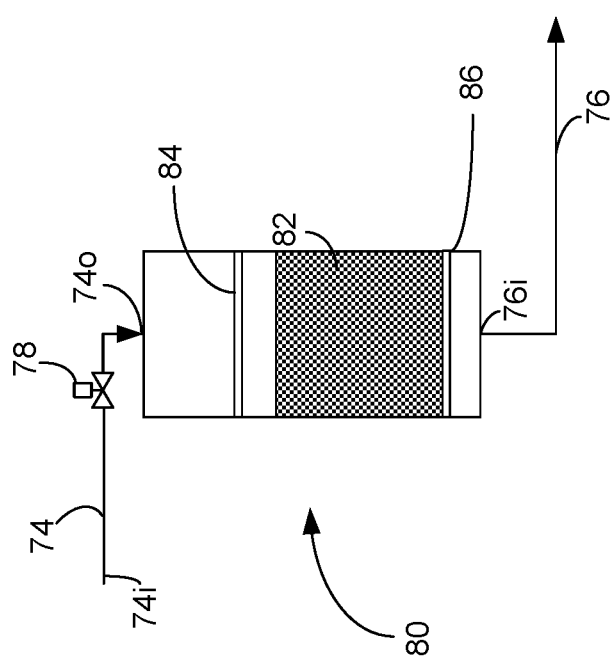
FIG. 2 is an enlarged partial view of FIG. 1.

More detail is given in FIG. 2 for the pressure reduction vessel 80. The pressure reduction vessel 80 may comprise a bed 82 of particulates. The inlet gas conduit 74 has an inlet end 74*i* in downstream communication with the catalyst regenerator 14 and perhaps the TSS 70 and an outlet end 74*o* in upstream communication with the bed 82 of particulates. The inlet gas conduit 74 passes the pressurized flue gas stream to the pressure reduction vessel 80. The bed 82 of particulates may be located in the vessel 80 between the outlet 74*o* of the inlet gas conduit 74 and an inlet 76*i* of an outlet gas conduit 76, so to pass the pressurized flue gas stream through the bed 82 of particulates in the vessel 80 to reduce the pressure of the flue gas stream.

A flow diffuser 84 upstream of the bed 82 of particulates comprising a perforated plate may spread gas flow across the cross section of the pressure reduction vessel 80 and the bed 82 of particulates. The perforations in the flow diffuser 84 should be at least 25% of the area of the plate so as to not impose the pressure drop on the flue gas stream. The flow diffuser 84 may instead of being flat may be conical, hemispherical or elliptical, such as with a 2:1 ratio of large and small axes.

The particulates in the bed 82 of particulates may comprise inert ceramic balls such as made from alumina and/or silica. For example, each inert ceramic ball may be 2.5, 5 or 7.5 cm (1, 2 or 3 inches) in diameter. Suitable ceramic balls may be commercially available from Saint-Gobain Norpro. Other sizes and types of particulates are contemplated.

A particulate support 86 downstream of the bed 82 of particulates comprising a perforated plate supports the bed 82 of particulates and allows the flue gas stream to pass through the bed 82 of particulates to exit the pressure reduction vessel 80 to the outlet gas conduit 76.

The perforations in the particulate support 86 should be at least 25% of the area of the plate so as to not impose a pressure drop on the flue gas stream. However, the openings must be small enough so as not to allow the particulates to pass through the particulate support 86. The particulate support 86 may instead of being flat may be conical, hemispherical or elliptical, such as with a 2:1 ratio of large and small axes. If conical, the particulate support should be steeper than the angle of repose of the particulates. If the particulates are ceramic balls, the angle of the cone relative to horizontal should be at least 45 degrees.

The pressurized flue gas stream passes through the valve 78, from the outlet 74*o* of the inlet gas conduit 74, through perforations in the flow diffuser 84 while spreading out across the cross section of the bed 82, travels through the bed of particulates in the vessel 80 to reduce the pressure of the flue gas stream, through the particulate support 86 and exits the vessel 80 through the inlet 76*i* of the outlet gas conduit 76. The flue gas stream exits from the vessel 80 at a lower pressure than at which it entered. Pressure reduction across the bed 82 can be about 100 kPa (14.5 psi) to about 300 kPa (44 psi) and preferably 138 kPa (20 psi) to about 241 kPa (35 psi).

The outlet gas conduit 76 is in downstream communication with the bed 82 of particulates at an outlet end 76*i*. The bed 82 of particulates is disposed between the outlet end 74*o* of the inlet conduit 74 and the inlet end 76*i* of the outlet conduit 76.

Figure 3:
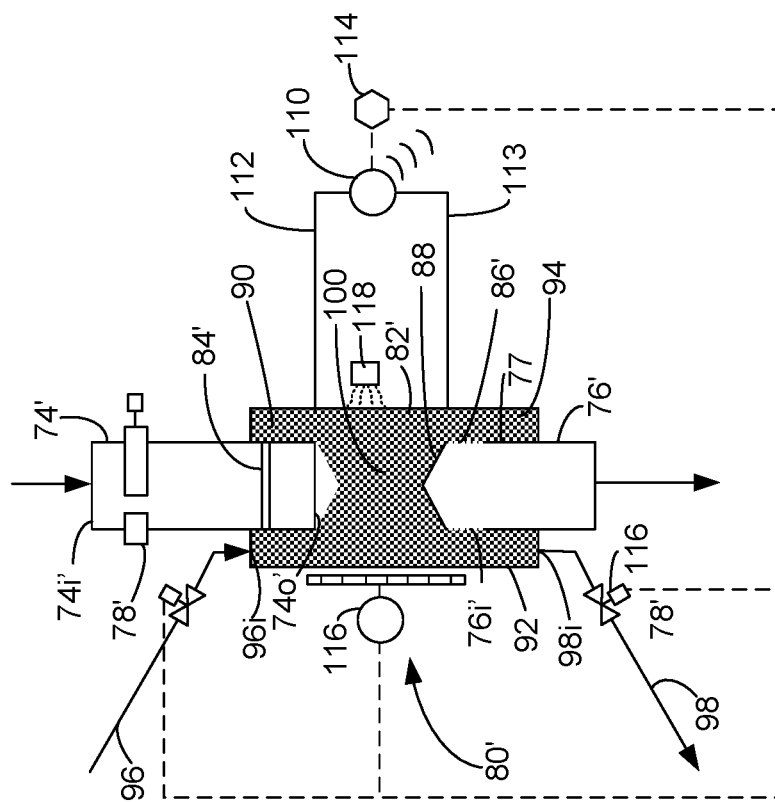
FIG. 3 is an alternative embodiment of FIG. 2.

FIG. 3 is an alternative embodiment of FIG. 2 which dynamically adds and withdraws particulates from the pressure reduction vessel. Many of the elements in FIG. 3 have the same configuration as in FIG. 2 and bear the same reference number. Elements in FIG. 3 that correspond to elements in FIG. 2 but have a different configuration bear the same reference numeral as in FIG. 1 but are marked with a prime symbol (').

In FIG. 3, the pressurized flue gas stream passes through the inlet 74i' of the inlet gas conduit 74', through a valve 78' and through a diffuser 84' which may be contained in the inlet gas conduit to spread the gas flow across the entire cross section of the inlet gas conduit. The pressurized flue gas exits an outlet 74o' of the inlet gas conduit 74' and enters into the bed 82' of particulates. The particulates may leave a conical gap between its upper surface and the outlet 74o' having an angle equivalent to the angle of repose of the particulates. The flue gas travels across the bed 80' of particulates and exits through an inlet 76i' to the outlet gas conduit 76'. The outlet gas conduit 76' may have a closed inlet end 88 and the inlet 76i' may be disposed in the side 77 of the outlet gas conduit 76'. The closed inlet end 88 may comprise a conical top that has an angle relative to horizontal equivalent to the angle of repose of the particulates in the bed 82'. The inlet 76i' may comprise perforations in a side 77 of the outlet gas conduit 76 that comprise at least 25% open area in the vicinity of the inlet 76i' but small enough, so that the particulates may not pass through, so as to provide a particulate support 86'. The flue gas reduced in pressure passes into the outlet conduit 76 through a side 77 of said outlet conduit where the inlet 76i' is located. The pressure drop across the bed of particulates between the outlet 74o' of the inlet gas conduit 74' and an inlet 76i' of the outlet gas conduit 76' reduces the pressure of the flue gas stream.

The inlet gas conduit 74' may have its outlet end extend into the pressure reduction vessel 80' so as to define an inlet annulus 90 between the wall 94 of the vessel 80 and the inlet gas conduit 74', and the outlet gas conduit 76' may have its inlet end extend into the pressure reduction vessel, so as to define an outlet annulus 92 between the wall 94 of the vessel 80 and the outlet conduit 76'.

Particulates may be added to the vessel 80' and removed from the vessel as they accumulate deposits from the flue gas flow or as desired to shift the pressure drop balance due to changes in throughput. A particulate inlet 96i in the vessel 80' on the end of a particulate addition line 96 may add particulates to the bed 82' of particulates. The particulate inlet 96i may be located at a location that does not receive gas flow, such as in the inlet annulus 90. As particulates are added to the inlet annulus 90, they make their way to an active area 100 of the bed 82' between the outlet 74o' of the gas inlet conduit 74' and the inlet 76i' of the gas outlet conduit 76' that receives gas flow. A particulate outlet 98i in the vessel 80' on the end of a particulate removal line 98 may withdraw particulates from the bed 82' of particulates. The particulate outlet 98i may be located at a location that does not receive gas flow, such as in the outlet annulus 94. As particulates are withdrawn from the outlet annulus 94, they make room for other added particulates to make their way into the active area 100 of the bed 82' between the inlet 74o' and the outlet 76i'. Because the inlet annulus 90 and the outlet annulus are remote from the active area 100, they do not receive gas flow.

The apparatus of FIG. 3 may also include a pressure drop indicator 110 that measures pressure in the pressure reduction vessel 80' between two taps 112, 113 located in the bed 82' of particulates. The pressure drop indicator 110 transmits a signal of the measured pressure drop to a computer 114. The pressure drop indicator 110 may transmit a signal wirelessly. When deposits accumulate on the particulates, pressure drop across the bed increases. If the measured pressure drop exceeds a predetermined value of pressure drop, the computer 114 signals a control valve 116 which may be on the particulate removal line 98 to open or open more to allow particulates or to allow more particulates to exit the particulate outlet 98i from the vessel 80 and the bed 82' of particulates. When an inlet valve on the particulate addition line 96 is open, discharge of particles through the particle outlet 98i into the particulate removal line 98 will allow particulates to enter the vessel 80 via the particle inlet 96i to the inlet annulus 90. Addition of fresh particulates will reduce pressure drop due to their absence of deposits.

When the measured pressure drop no longer exceeds the predetermined pressure drop, the computer 114 signals the control valve 116 on the particulate removal line 98 to close or to close more than it was thus disallowing or restricting particulates to exit the particulate outlet 98i. The computer 114 may also send a signal to a control valve on the particulate addition line 96 to cooperate with the control process. The vessel 80' may also be equipped with a level indicator 116 which may operate by registering the transmittance of gamma rays at different levels emitted from a gamma ray source 118.

Network devices 535 that may include the pressure drop indicator 110 can comprise sensors in communication with various streams in lines in the FCC unit 10 for determining compositions and/or conditions of the stream therein and a transmitter for transmitting a signal or data constituting the measurement to an appropriate receiver. The network devices 535 may be in direct communication, indirect communication, upstream communication and/or downstream communication with the streams in the lines in the Figures. The network device 535 may be in a line transporting a stream derived from or fed to the FCC unit 10 in the Figures. Network devices 535 with sensors and transmitters may be provided on a line to or from the FCC unit 10 to measure a composition and/or condition of a product stream therein and transmit a signal or information constituting the measurement to an appropriate receiver. The sensor may include a temperature gauge, a pressure gauge, a molecular weight analyzer, a specific gravity analyzer, a flow meter, a gas chromatograph, an x-ray diffractometer or any other such sensing or measuring device.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 4:
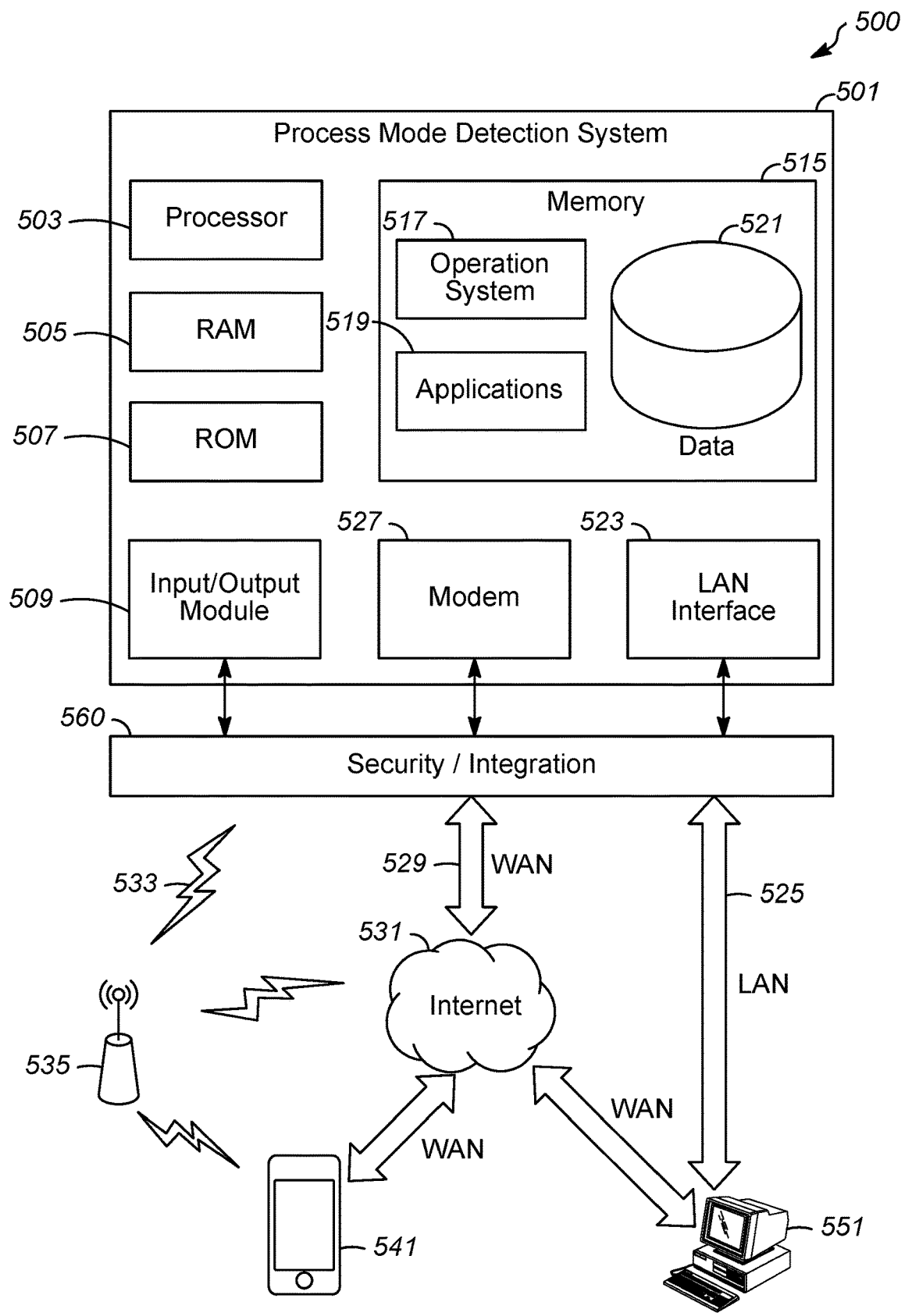
FIG. 4 illustrates a block diagram.

FIG. 4 illustrates a block diagram of a process mode detection system 501 in a sensor data analysis system 500 that may be used with the FCC unit 10 according to one or more illustrative embodiments of the disclosure. The system 501 may be used to collect data from and/or operate or control the FCC unit 10. The system 501 may have a processor 503 for controlling overall operation of the system 501 and its associated components, including RAM 505, ROM 507, input/output module 509, and memory 515. The system 501, along with one or more additional devices (e.g., terminals 541, 551) may correspond to any of multiple systems or devices, such as mobile computing devices (e.g., smartphones, smart terminals, tablets, and the like) and/or vehicular-based computing devices, configured as described herein for collecting and analyzing sensor data from mobile devices associated with vehicles, particularly acceleration data and location data.

Input/output (I/O) 509 may include a microphone, keypad, touch screen, and/or stylus through which a user of the system 501 may provide input, and may also include one or more of a speaker for providing audio output and a video display device for providing textual, audiovisual and/or graphical output. Software may be stored within memory 515 and/or storage to provide instructions to processor 503 for enabling system 501 to perform various functions. For example, memory 515 may store software used by the system 501, such as an operating system 517, application programs 519, and an associated internal database 521. Processor 503 and its associated components may allow the system 501 to execute a series of computer-readable instructions to transmit or receive data, analyze data, and store analyzed data.

The system 501 may operate in a networked environment supporting connections to one or more remote computers, such as terminals/devices 541 and 551. System 501, and related terminals/devices 541 and 551, may include devices or sensors associated with equipment, streams, or materials of the FCC unit 10 or the refinery comprising the FCC unit, including devices on-line or outside of equipment, streams, or materials, that are configured to receive and process data. Thus, the system 501 and terminals/devices 541 and 551 may each include personal computers (e.g., laptop, desktop, or tablet computers), servers (e.g., web servers, database servers), sensors, measurement devices, communication systems, or mobile communication devices (e.g., mobile phones, portable computing devices, and the like), and may include some or all of the elements described above with respect to the system 501.

The network connections depicted in FIG. 4 include a local area network (LAN) 525 and a wide area network (WAN) 529, and a wireless telecommunications network 533, but may also include other networks. When used in a LAN networking environment, the system 501 may be connected to the LAN 525 through a network interface or adapter 523. When used in a WAN networking environment, the system 501 may include a modem 527 or other means for establishing communications over the WAN 529, such as network 531 (e.g., the Internet). When used in a wireless telecommunications network 533, the system 501 may include one or more transceivers, digital signal processors, and additional circuitry and software for communicating with wireless computing devices 541 (e.g., mobile phones, short-range communication systems, telematics devices) via one or more network devices 535 (e.g., base transceiver stations) in the wireless network 533. Network devices 535 can comprise sensors in communication with various streams in lines in the FCC unit 10 or the refinery comprising the FCC unit for determining compositions and/or conditions of the stream therein. The network devices 535 can transmit measurement signals from a transmitter in the network device through either the wireless network 533, the WAN 529 or the LAN 525.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices spent catalyst measurement system components described herein may be configured to communicate using any of these network protocols or technologies.

Also illustrated in FIG. 4 is a security and integration layer 560, through which communications may be sent and managed between the system 501 (e.g., a user's personal mobile device, a refinery-based system, external server, etc.) and the remote devices (541 and 551) and remote networks (525, 529, and 533). The security and integration layer 560 may comprise one or more separate computing devices, such as web servers, authentication servers, and/or various networking components (e.g., firewalls, routers, gateways, load balancers, etc.), having some or all of the elements described above with respect to system 501. As an example, a security and integration layer 560 of a mobile computing device, refinery-based device, or a server operated by a provider, an institution, governmental entity, or other organization, may comprise a set of web application servers configured to use secure protocols and to insulate the system 501 from external devices 541 and 551. In some cases, the security and integration layer 560 may correspond to a set of dedicated hardware and/or software operating at the same physical location and under the control of same entities as system 501. For example, layer 560 may correspond to one or more dedicated web servers and network hardware in an organizational datacenter or in a cloud infrastructure supporting a cloud-based spent catalyst measurement system. In other examples, the security and integration layer 560 may correspond to separate hardware and software components which may be operated at a separate physical location and/or by a separate entity.

As discussed below, the data transferred to and from various devices in sensor data analysis system 500 may include secure and sensitive data, such as measurement data, flow control data, concentration data, and instructions. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the sensor data analysis system 500, by using the security and integration layer 560 to authenticate users and restrict access to unknown or unauthorized users. In various implementations, security and integration layer 560 may provide, for example, a file-based integration scheme or a service-based integration scheme for transmitting data between the various devices in the sensor data analysis system 500. Data may be transmitted through the security and integration layer 560, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the system 501, in the sensor data analysis system 500 and/or the security and integration layer 560. The web services may be accessed by authorized external devices and users to support input, extraction, and manipulation of the data (e.g., sensing data, concentration data, flow control data, etc.) between the system 501 in the sensor data analysis system 500. Web services built to support the sensor data analysis system 500 may be cross-domain and/or cross-platform, and may be built for enterprise use. Such web services may be developed in accordance with various web service standards, such as the Web Service Interoperability (WS-I) guidelines. In some examples, a flow control data and/or concentration data web service may be implemented in the security and integration layer 560 using the Secure Sockets Layer (SSL) or Transport Layer Security (TLS) protocol to provide secure connections between servers (e.g., the system 501) and various clients 541 and 551 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 560 may include specialized hardware for providing secure web services. For example, secure network appliances in the security and integration layer 560 may include built-in features such as hardware-accelerated SSL and HTTPS, WS-Security, and firewalls. Such specialized hardware may be installed and configured in the security and integration layer 560 in front of the web servers, so that any external devices may communicate directly with the specialized hardware.

In some aspects, various elements within memory 515 or other components in sensor data analysis system 500, may include one or more caches, for example, CPU caches used by the processing unit 503, page caches used by the operating system 517, disk caches of a hard drive, and/or database caches used to cache content from database 521. For embodiments including a CPU cache, the CPU cache may be used by one or more processors in the processing unit 503 to reduce memory latency and access time. In such examples, a processor 503 may retrieve data from or write data to the CPU cache rather than reading/writing to memory 515, which may improve the speed of these operations. In some examples, a database cache may be created in which certain data from a database 521 (e.g., an operating parameter database, a concentration database, correlation database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving data, collecting data, recording stat, processing data, and analyzing data, such as faster response times and less dependence on network conditions when transmitting/receiving data.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 519 may be used by the system 501 within a sensor data analysis system 500 (e.g., flow control software applications, device configuration software applications, and the like), including computer executable instructions for receiving and storing data from refinery-based systems, and/or mobile computing devices, analyzing the data to determine the composition, flow rates and/or conditions of streams at desired locations; analyzing data to determine the setting or adjustment to the flow of streams in the lines; analyzing data to determine the conditions or adjustment to conditions in vessels; and determining and configuring the mobile computing device based on the retrieved and analyzed data, and/or performing other related functions as described herein.

The processor 503 may be configured to issue or recommend a command message to adjust conditions in the FCC unit 10. The command message may be transmitted from the process mode detection system 501 in an encrypted or unencrypted message that commands one or more adjustments to conditions in the FCC unit 10. The command may be communicated through the I/O module 509, the modem 527 or the LAN interface 523 through the security/integration layer 560 and received by a network device 535 or terminals 541, 551 in the FCC unit 10 or the refinery comprising the FCC unit to cause adjustments or halting/starting of one or more operations in the FCC unit 10 or the refinery. The command message may be transmitted to a terminal 541, 551 for processing and/or execution. In an alternative embodiment, the command may be directly communicated, either wirelessly or in a wired fashion, to physical components in the FCC unit 10 or in the refinery containing the FCC unit such that the physical components include an network device 535 to receive the commands and execute the command. Terminals 541, 551 may automatically signal execution of the command or a prompt to an operator to manually execute the adjustment. Such adjustment command messages can be transmitted back to the FCC unit 10 to be received and executed to modify or improve performance of the FCC unit.

Specific Embodiments

While the following is described in conjunction with specific embodiments, it will be understood that this description is intended to illustrate and not limit the scope of the preceding description and the appended claims.

A first embodiment of the invention is a system comprising (a) at least one processor; (b) at least one memory storing computer-executable instructions; and (c) at least one receiver configured to receive data from at least one line in fluid communication with a vessel for reducing pressure of a flue gas stream comprising a vessel comprising a bed of particulates; an inlet gas conduit in communication with a catalyst regenerator at an inlet end and an outlet end of the inlet conduit in communication with the bed of particulates; an outlet gas conduit in communication with the bed of particulates at an inlet end; and the bed of particulates between the outlet end of the inlet conduit and the inlet end of the outlet conduit. An embodiment of the invention is one, any or all of prior embodiments in this paragraph up through the first embodiment in this paragraph wherein the at least one receiver is further configured to receive data from a sensor on a line in fluid communication with an FCC unit. An embodiment of the invention is one, any or all of prior embodiments in this paragraph up through the first embodiment in this paragraph wherein the at least one receiver is further configured to record data on the composition and/or condition of a stream in the at least one line in fluid communication with the vessel. An embodiment of the invention is one, any or all of prior embodiments in this paragraph up through the first embodiment in this paragraph further comprising an input/output device to collect the data.

An embodiment of the invention is one, any or all of prior embodiments in this paragraph up through the first embodiment in this paragraph wherein the processor is configured to evaluate the data. An embodiment of the invention is one, any or all of prior embodiments in this paragraph up through the first embodiment in this paragraph wherein the processor is configured to correlate the data. An embodiment of the invention is one, any or all of prior embodiments in this paragraph up through the first embodiment in this paragraph further comprising a transmitter to transmit a signal to the receiver. An embodiment of the invention is one, any or all of prior embodiments in this paragraph up through the first embodiment in this paragraph wherein the signal comprises instructions. An embodiment of the invention is one, any or all of prior embodiments in this paragraph up through the first embodiment in this paragraph wherein the signal is transmitted from the sensor on at least one line in fluid communication with an FCC unit. An embodiment of the invention is one, any or all of prior embodiments in this paragraph up through the first embodiment in this paragraph further comprising collecting data from multiple systems including the system. An embodiment of the invention is one, any or all of prior embodiments in this paragraph up through the first embodiment in this paragraph wherein the processor is configured to generate predictive information.

A second embodiment of the invention is a method for receiving data from a stream in fluid communication with a vessel for reducing pressure of a flue gas stream the method comprising passing a pressurized flue gas stream to a vessel; passing the pressurized flue gas stream through a bed of particulates in the vessel to reduce the pressure of the flue gas stream; passing the flue gas stream from the vessel at a lower pressure; and receiving data from a sensor on a stream in communication with the vessel An embodiment of the invention is one, any or all of prior embodiments in this paragraph up through the second embodiment in this paragraph further comprising receiving data on the composition and/or condition of the stream. An embodiment of the invention is one, any or all of prior embodiments in this paragraph up through the second embodiment in this paragraph further comprising displaying the received data. An embodiment of the invention is one, any or all of prior embodiments in this paragraph up through the second embodiment in this paragraph further comprising transmitting the received data. An embodiment of the invention is one, any or all of prior embodiments in this paragraph up through the second embodiment in this paragraph further comprising analyzing the received data. An embodiment of the invention is one, any or all of prior embodiments in this paragraph up through the second embodiment in this paragraph further comprising analyzing the received data to generate at least one instruction and transmitting the at least one instruction. An embodiment of the invention is one, any or all of prior embodiments in this paragraph up through the second embodiment in this paragraph further comprising analyzing the received data and generating predictive information. An embodiment of the invention is one, any or all of prior embodiments in this paragraph up through the second embodiment in this paragraph wherein the predictive information comprises catalyst performance or catalyst life or both.

A third embodiment of the invention is a system comprising (a) at least one processor; (b) at least one memory storing computer-executable instructions; and (c) at least one receiver configured to receive data from a sensor on a line in fluid communication with a vessel for reducing pressure of a flue gas stream comprising a vessel comprising a bed of particulates; an inlet gas conduit in communication with a catalyst regenerator at an inlet end and an outlet end of the inlet conduit in communication with the bed of particulates; a particulate inlet in the vessel for adding particulates to the bed of particulates, the particulate inlet located in a portion of the vessel that does not receive gas flow; an outlet gas conduit in communication with the bed of particulates at an inlet end; a particulate outlet in the vessel for withdrawing particulates from the bed of particulates, the particulate outlet located in a portion of the vessel that does not receive gas flow; and the bed of particulates between the outlet end of the inlet conduit and the inlet end of the outlet conduit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A system comprising:
   (a) at least one processor;
   (b) at least one memory storing computer-executable instructions; and
   (c) at least one receiver configured to receive data from at least one line in fluid communication with a vessel for reducing pressure of a flue gas stream comprising: a vessel comprising a bed of particulates; an inlet gas conduit in communication with a catalyst regenerator at an inlet end and an outlet end of said inlet conduit in communication with said bed of particulates; an outlet gas conduit in communication with said bed of particulates at an inlet end; and said bed of particulates between the outlet end of the inlet conduit and the inlet end of the outlet conduit.

2. The system of claim 1 wherein the at least one receiver is further configured to receive data from a sensor on a line in fluid communication with an fluid catalytic cracking unit.

3. The system of claim 1 wherein the at least one receiver is further configured to record data on the composition and/or condition of a stream in said at least one line in fluid communication with said vessel.

4. The system of claim 1 further comprising an input/output device to collect the data.

5. The system of claim 1 wherein the processor is configured to evaluate the data.

6. The system of claim 1 wherein the processor is configured to correlate the data.

7. The system of claim 1 further comprising a transmitter to transmit a signal to the receiver.

8. The system of claim 7 wherein the signal comprises instructions.

9. The system of claim 7 wherein the signal is transmitted from the sensor on at least one line in fluid communication with an fluid catalytic cracking unit.

10. The system of claim 1 further comprising collecting data from multiple systems including said system.

11. The system of claim 1 wherein the processor is configured to generate predictive information.

12. A method for receiving data from a stream in fluid communication with a vessel for reducing pressure of a flue gas stream the method comprising:
   passing a pressurized flue gas stream to a vessel;
   passing the pressurized flue gas stream through a bed of particulates in the vessel to reduce the pressure of the flue gas stream;
   passing the flue gas stream from the vessel at a lower pressure; and
   receiving data from a sensor on a stream in communication with said vessel.

13. The method of claim 12 further comprising:
   receiving data on the composition and/or condition of said stream.

14. The method of claim 12 further comprising displaying the received data.

15. The method of claim 12 further comprising transmitting the received data.

16. The method of claim 12 further comprising analyzing the received data.

17. The method of claim 12 further comprising analyzing the received data to generate at least one instruction and transmitting the at least one instruction.

18. The method of claim 12 further comprising analyzing the received data and generating predictive information.

19. The method of claim 18 wherein the predictive information comprises catalyst performance or catalyst life or both.

20. A system comprising:
   (a) at least one processor;
   (b) at least one memory storing computer-executable instructions; and
   (c) at least one receiver configured to receive data from a sensor on a line in fluid communication with a vessel for reducing pressure of a flue gas stream comprising: a vessel comprising a bed of particulates; an inlet gas conduit in communication with a catalyst regenerator at an inlet end and an outlet end of said inlet conduit in communication with said bed of particulates; a particulate inlet in said vessel for adding particulates to said bed of particulates, said particulate inlet located in a portion of said vessel that does not receive gas flow; an outlet gas conduit in communication with said bed of particulates at an inlet end; a particulate outlet in said vessel for withdrawing particulates from said bed of particulates, said particulate outlet located in a portion of said vessel that does not receive gas flow; and said bed of particulates between the outlet end of the inlet conduit and the inlet end of the outlet conduit.

* * * * *